July 17, 1956

R. H. HODGES 2,755,125

INFLATABLE CRASH PROTECTOR FOR VEHICLES

Filed June 8, 1953

Robert H. Hodges
INVENTOR.

BY
Attorneys

July 17, 1956  R. H. HODGES  2,755,125
INFLATABLE CRASH PROTECTOR FOR VEHICLES
Filed June 8, 1953  3 Sheets-Sheet 2
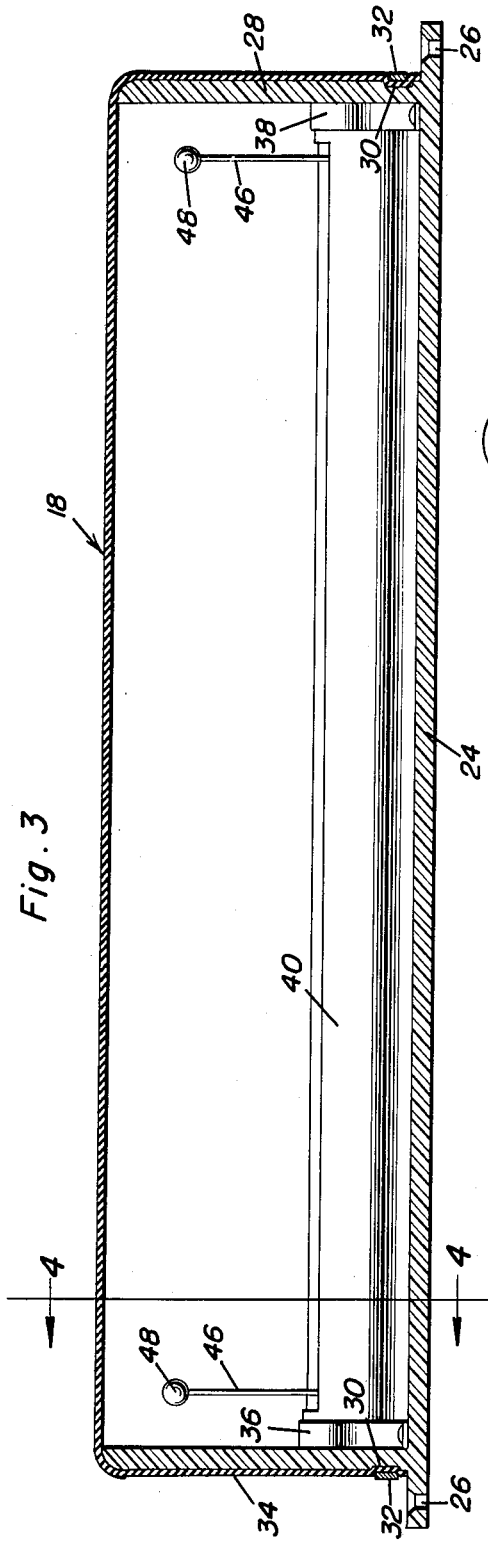
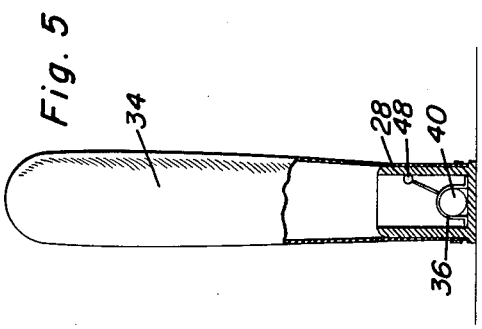
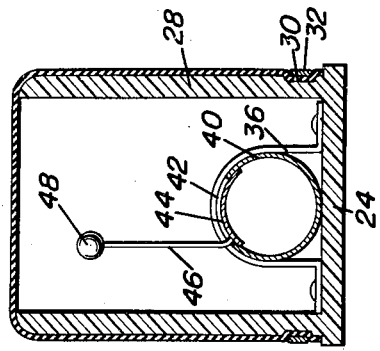
Robert H. Hodges
INVENTOR.

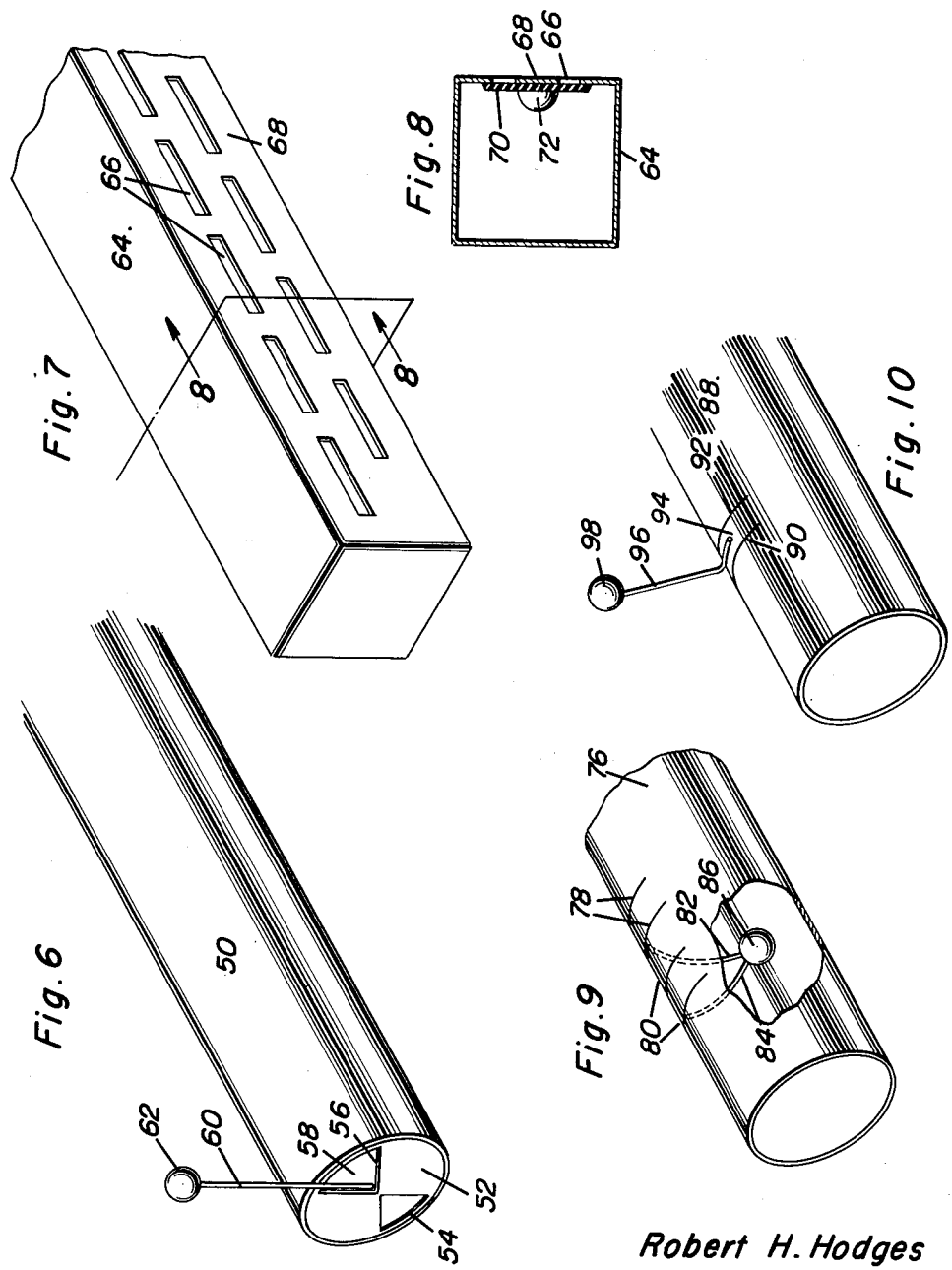

United States Patent Office 2,755,125
Patented July 17, 1956

2,755,125

INFLATABLE CRASH PROTECTOR FOR VEHICLES

Robert H. Hodges, Columbia, S. C.

Application June 8, 1953, Serial No. 360,122

2 Claims. (Cl. 296—84)

This invention relates to a safety device for the protection of passengers in vehicles and is especially adapted for use in automobile, aircraft, and like means of transportation whereby upon an accident or other casualty a protective resilient barrier is provided so as to protect an occupant of the vehicle from serious injury.

The construction of this invention features the use of a container of compressed air having inertia responsive means for opening the container so as to inflate a resilient inflatable member, the inflatable member acting as a cushion or pillow so as to eliminate the possibility of injury to the occupant of an automobile or like vehicle caused by striking a hard unyielding surface in front of them due to the effect of the laws of inertia upon the occupant's body.

It is well known that all structures are responsive to the laws of inertia based, of course, on the recognized formula of force being equal to the mass of the body affected and multiplied by the acceleration or deceleration thereof. Further, it is well known that the distance travelled is equivalent to one-half the acceleration times the square of the time involved. It is the concept of this invention to provide an inertia actuating means consisting of a mass at the end of a lever arm for providing sufficient force to open a closure element to thereby release gas to inflate a cushion, the distance that the weight is required to move being much less than the distance required of the body of the occupant to move, therefore requiring considerably less time to complete its function allowing the compressed gas to fully escape in time to protect the occupant of the vehicle from injury.

It is expected to utilize this invention in the dashboard or instrument panel of an automobile or like vehicle, the invention being especially adapted to conform to the general interior decor of the vehicle to thereby provide an unobtrusive and pleasing appearance comparable to the resilient padding now used on vehicles yet which is much more efficient in providing protection for the occupant of the vehicle. It is further expected to use this device on various portions of the vehicle so as to protect both the passengers in the rear portion of the vehicle as well as in the "death seat" to the right of the operator of the vehicle or in fact the operator himself.

Still further objects and features of this invention reside in the provision of a crash protector which is comparatively simple in construction and manufacture, that is selective of the degree of deceleration caused by impact during a collison from that occurring during normal operation of the brakes of the vehicle, which is easy to install, and which requires almost no maintenance yet which will be continuously ready for emergency use.

These, together with the various ancillary objects and features of the invention which will become apparent as the following description proceeds, are obtained by this crash protector, preferred embodiments of which have been illustrated in the accompanying drawings, by way of example only, wherein:

Figure 3 is a vertical sectional view of the crash protector as is shown in Figure 1 and illustrating the construction of the device in greatest detail;

Figure 4 is a vertical sectional view as taken along the plane of line 4—4 in Figure 3;

Figure 5 is a vertical sectional view of the device shown in an inflated position;

Figure 6 is a perspective view illustrating a modified form of the invention employing a cylindrical container of compressed gas having its walls provided with apertures therethrough;

Figure 7 is a perspective detail of a further modified form of the invention disclosing a plurality of apertures in one wall of the container;

Figure 8 is a sectional detail view as taken along the plane of line 8—8 in Figure 7 illustrating the inertia responsive means for closing the apertures shown in Figure 7;

Figure 9 is a perspective view of another form of the invention with parts thereof being broken away to show other parts in detail; and Figure 10 is a perspective view of yet another form of the invention.

Figure 1:
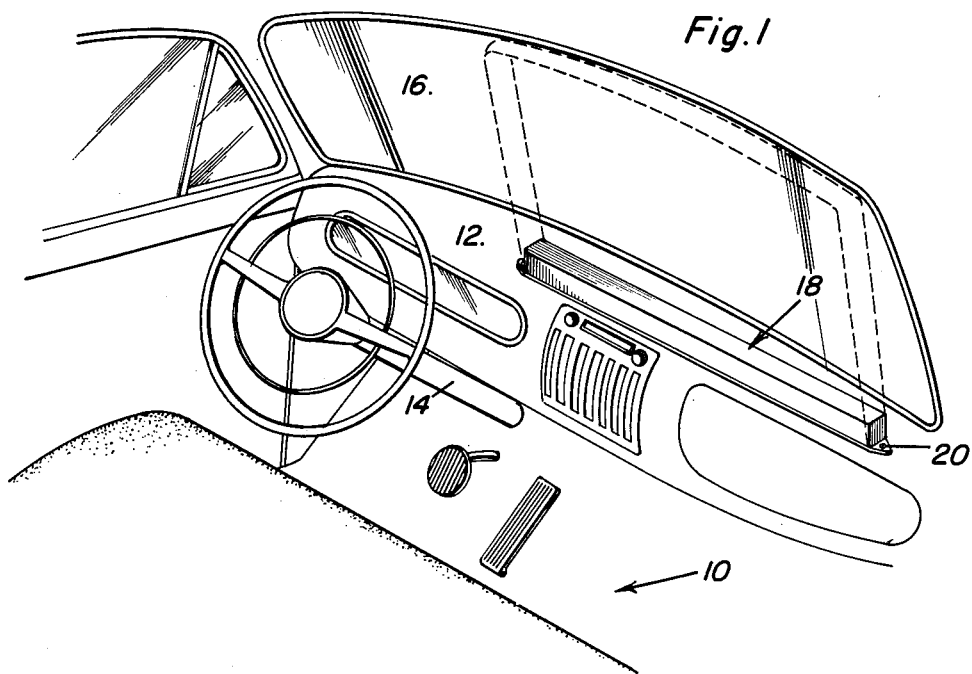
Figure 1 is a perspective view showing the invention as installed as an attachment on the dashboard or instrument panel of a conventional automobile.
Figure 2:
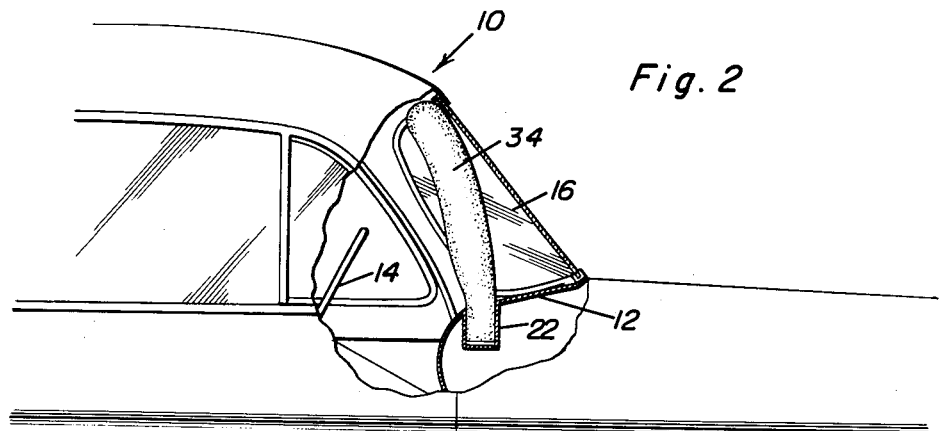
Figure 2 is a side elevational view of the device as installed in the instrument panel of a vehicle having been constructed and especially adapted for the installation of this device, parts of the vehicle being shown in section in order to show the crash protector in an inflated condition in greatest detail.

With continuing reference to the accompanying drawings wherein like reference numerals designate similar parts throughout the various views, reference numeral 10 generally designates a conventional automobile provided with an instrument board 12, a steering column with steering wheel 14 and a windshield 16. The device comprising one form of the present invention is generally indicated at 18 and may be secured to the instrument panel 12 by suitable screws 20 or other fastening means. In the embodiment of the invention as shown in Figure 2 a cavity or a recess 22 is formed in the instrument panel 12 in order that this crash protector may be factory installed.

The crash protector 18 as can be seen best in Figures 3 through 5 includes a base 24 having apertures 26 therethrough through which the screws or fasteners 20 extend. The base 24 together with the rectangular side walls 28 thereof are integrally formed from a suitable material such as any of the synthetic plastic resins. The side walls 28 are provided with a peripheral groove 30 therein adjacent the base 24. A retaining band 32 formed from metal or other suitable material is positioned over a resilient flexible inflatable covering 34 and holds the covering 34 sealed in the recess 30 in gas-tight relationship. Clampingly secured to the base 24 by means of clamp elements 36 and 38 which are of substantially inverted U-shape is a cylindrical container 40 having an elongated slot 42 in the upper portion thereof forming an opening. The container 40 is filled with a suitable compressed gas, such as carbon dioxide, or air which would be readily capable of being placed in the container 40. An arcuate inner plate 44 is positioned against the sides of the container 40 and underlies the slot 42. The plate 44 forms a closure member and is held in position by the force exerted by the compressed gas thereon. Obviously, the plate 44 is initially held in position during the filling of the container 40 by other means. The container 40 may, of course, be filled through any suitable aperture formed therein which aperture may be closed as by welding or other sealing means. The plate 44 has a lever 46 attached thereto and rising upwardly therefrom, the lever 46 having a spherically shaped weight 48 at the free end thereof. It is noted that a pair of the levers 46 may be utilized on either end of the container 40 and likewise a pair of weights 48 are secured to the pair of levers 46.

During normal operation of the car when brakes are applied a force exerted through the rods 46 by the weights 48 are not enough to overcome the frictional components of the force exerted by the gas pressure against the plate 44 and hence the container 40 remains sealed. However, when the inertia is increased to many times the force of gravity as would happen during a collision the weight 48 will quickly move to tear the plate 44 free from its closed position over the opening 42 thereby almost instantaneously inflating the resilient covering 34. The final position of the device is shown in Figure 5. As can be readily understood, when the embodiment of the invention as in Figure 2 is utilized the framework including the base 24 and sides 28 are integrally formed with the dashboard 12.

It is to be understood that the covering 34 is of such form that when inflated it will protect the passenger from hitting the instrument panel 12 or the windshield 16. Likewise, the device may be attached overhead to protect the head of an occupant from hitting the top of a car and may optionally be formed in conjunction with the steering wheel so as to prevent the operator from being subject to the internal injuries usually a result of serious accidents.

In the embodiment as is shown in Figure 6 it will be noted that the container 50 is provided with end walls 52 having openings 54 and 56 therein which are radially disposed. A plate 58 is provided on the interior of the cylinder 50 and held in place by the compressed gas so as to close the openings 54 and 56. A lever 60 is affixed to the plate 58 and carries a weight of spherical shape as at 62. Hence, upon subjecting the device to the proper amount of deceleration or acceleration the weight 62 will move causing the weight 58 to rotate and allowing gas to escape from the apertures 54 and 56 to inflate a covering similar to the covering 34.

In the embodiment of the invention as is shown in Figures 7 and 8 it will be noticed that herein the container 64 is provided with a series of apertures 66 therethrough which are formed in one of the sides 68 of the container 64. Secured to the side 68 in the interior thereof and at either end is a diaphragm 70 formed of rubber or other suitable impervious flexible material. Attached to the diaphragm 70 are weights 72 which are adopted when affected by a suitable amount of deceleration to withdraw the diaphragm 70 from its closure relationship to the opening 66 thereby permitting compressed gases within the container 64 to escape.

In the embodiment of the invention as is shown in Figure 9 it will be noted that herein the container 76 is formed with a series of paths of weakened portions as at 78 and 80 so as to form break slots. Attached to the portion of the container 76 between the respective weakened portions 78 and 80 are rods 82 and 84. It is to be noted that in effect the portions between the weakened portions 78 and 80 effectually form closures for openings that will be formed in the container 76 when the spherical weight 86 is moved thus tearing the container 76 at the weakened portions 78 and 80 and allowing escape of gas. In the embodiment of Figure 10 there is shown a container 88 having weakened portions as at 90 and 92 forming integral closure element 94 to which a rod 96 having a spherical weight 98 is attached. Hence, upon movement of the weight 98 due to inertia the weakened portions 90 and 92 will give way thus opening the container 88 had permitting the gas therein to escape to inflate a suitable covering such as the covering 34.

It is to be noted that the weakened portions 78 and 80 may actually consist of protrusions on the container which are broken by inertia of the weight 86 the protrusions actually forming a seal for the container which is otherwise slotted.

A further concept of the invention includes the positioning of the air container outside of the confines of the crash protector and connected thereto by suitable openings. It is to be understood that the inflatable coverings as at 34 may be directed rearwardly so as to protect the passenger from hitting the instrument panel.

Since from the foregoing the construction and advantages of this crash protector are readily apparent, further description is believed to be unnecessary.

However, since numerous modifications will readily occur to those skilled in the art after a consideration of the foregoing specification and accompanying drawings, it is not intended to limit the invention to the precise embodiments shown and described but with all suitable modifications and equivalents may be readily utilized which fall within the scope of the appended claims.

What is claimed as new is as follows:

1. An inertia actuated crash protector for vehicles comprising a hollow frame, a resilient inflatable covering on said frame, a container of compressed gas in said frame, and inertia responsive means for opening said container to inflate said covering, said container having weakened points forming break slots, said inertia responsive means comprising a lever attached to said break slots, and a weight attached to the free end of said lever.

2. An inertia actuated crash protector for vehicles comprising a hollow frame, a resilient inflatable covering on said frame, a container of compressed gas in said frame, and inertia responsive means for opening said container to inflate said covering, said container having weakened points forming break slots, said inertia responsive means comprising a lever attached to said break slots, and a weight attached to the free end of said lever, said lever being entirely positioned within said container.

References Cited in the file of this patent

UNITED STATES PATENTS

| | | |
|---|---|---|
| 923,801 | Bargar | June 8, 1909 |
| 1,075,125 | Schmitt | Oct. 7, 1913 |
| 1,327,190 | Bigoney | Jan. 6, 1920 |
| 1,836,495 | Paulson | Dec. 15, 1931 |
| 2,371,863 | White | Mar. 20, 1945 |
| 2,424,597 | Werry | July 29, 1947 |
| 2,499,793 | Stearns | Mar. 7, 1950 |
| 2,649,311 | Hetrick | Aug. 18, 1953 |

FOREIGN PATENTS

| | | |
|---|---|---|
| 896,312 | Germany | Nov. 12, 1953 |